United States Patent [19]
De Boer

[11] Patent Number: 6,078,362
[45] Date of Patent: Jun. 20, 2000

[54] DEVICE FOR COMBINING VIDEO SIGNALS WHICH REPRESENT IMAGES HAVING A DIFFERENT PERCEPTION DEPTH

[75] Inventor: Jan De Boer, Baarn, Netherlands

[73] Assignee: Janima Beheer B.V., Baarn, Netherlands

[21] Appl. No.: 09/017,556

[22] Filed: Feb. 3, 1998

[30] Foreign Application Priority Data

Feb. 3, 1997 [NL] Netherlands ............................ 1005173

[51] Int. Cl.⁷ ...................................................... H04N 9/74
[52] U.S. Cl. ............................................ 348/585; 348/705
[58] Field of Search ..................................... 348/584, 585, 348/384, 385, 387, 423, 845, 705, 586

[56] References Cited

U.S. PATENT DOCUMENTS

| | | | |
|---|---|---|---|
| 5,400,080 | 3/1995 | Oka .......................................... | 348/585 |
| 5,600,646 | 2/1997 | Polomski ................................. | 348/384 |
| 5,657,096 | 8/1997 | Lukacs ..................................... | 348/585 |
| 5,872,565 | 2/1999 | Greaves et al. .......................... | 348/585 |

FOREIGN PATENT DOCUMENTS

| | | |
|---|---|---|
| 0 260 998 | 3/1988 | European Pat. Off. . |
| 0 366 871 | 5/1990 | European Pat. Off. . |
| 2 155 729 | 9/1985 | United Kingdom . |

*Primary Examiner*—Christopher S. Kelley
*Assistant Examiner*—Allen Wong
*Attorney, Agent, or Firm*—Young & Thompson

[57] ABSTRACT

Device for combining p video signals which represent images having a different perception depth, comprising p sources which each generate a video signal in the form of a series of pixels, each accompanied by a priority signal which determines the depth of the signal and a key signal which determines a local change in depth, selection means for selecting in each case the m pixels having the m highest priorities, a mixing stage in which the selected m pixels are mixed.

All the p sources are coupled to the mixing stage via a bus system provided with a pixel data bus, a key-signal bus and a priority-signal bus.

Each source is provided with a priority-bus detector with which the signals are received on the priority bus and are compared with its own priority, and is provided with switching means controlled by the priority-bus detector in such a way that only the sources having the m highest priorities and the bus are connected to the mixing stage.

6 Claims, 3 Drawing Sheets

DEVICE FOR COMBINING VIDEO SIGNALS WHICH REPRESENT IMAGES HAVING A DIFFERENT PERCEPTION DEPTH

The invention relates to a device for combining video signals which represent images having a different perception depth, comprising
- a number of sources which each generate a video signal in the form of a series of pixels, each accompanied by a priority signal which determines the depth of the signal and a key signal which determines a local change in depth,
- selection means for selecting in each case those pixels in the simultaneously available video signals which are currently accompanied by a priority signal corresponding to the highest and the second highest priority,
- a mixing stage in which the selected pixels are mixed, account being taken of the key signal.

Such a device is disclosed in U.S. Pat. No. 5,400,080. In this known device, the selection means are formed by the series connection of a number of channel selectors. Each channel selector has three inputs and two outputs. Connected to the three inputs of the first channel selector are three sources. The first channel selector selects, on the basis of the priority signals, the two video signals having the highest and the second highest priority and passes them, together with their priority signal and key signal, to two inputs of a subsequent channel selector. A subsequent source is connected to the third input. This channel selector again selects, on the basis of the priority signals, those video signals having the highest and second highest priority and feeds them through, together with their priority signal and key signal, to two inputs of a subsequent channel selector. Finally, the last channel selector selects from the series two video signals which have the highest and second highest priority and said video signals are passed on, together with their key signal, to a mixing stage in which the final, combined video signal is obtained by mixing.

A first disadvantage of this known device is the fact that a large number of channel selectors connected in series is necessary to perform the selection process. In principle, a total of m−2 channel selectors is necessary for m signal sources. If it is desired to increase the number of sources, a channel selector has to be added for each additional source.

A second disadvantage is the time which is necessary to perform the selection process. Since the selection process can take place in each channel selector only after the previous channel selector has completed its selection process, the time necessary for the total selection process will increase as more sources are connected to the device. The time delay resulting therefrom can lead to problems if there are a large number of sources.

Another disadvantage relates to the restriction to only two pixels in the final mixing process. In principle, the mixing process can be extended to three or more pixels which are each accompanied by a priority signal and an adjusted key signal.

The object of the invention is therefore to design a device of the type mentioned in the preamble in such a way that a relatively large number of channel selectors is not necessary, that the addition of signal sources is simple, that the time needed for the selection and mixing process remains limited regardless of the number of sources connected and that mixing of more than two highest-value pixels can be achieved without many problems.

The device which is provided by the invention and which meets the specification given in the first paragraph, is characterized
- in that all the sources are coupled to the mixing stage via a bus system provided with a pixel data bus, a key-signal bus and a priority-signal bus,
- in that the priority-signal bus has a number of conductors which is at least equal to the number of sources, each of the conductors corresponding to a certain priority,
- in that the priority signals comprise a single bit which is placed on the corresponding conductor of the priority-signal bus by each source,
- in that each source is provided with a priority-bus detector with which the signals on the priority bus are received and are compared with its own priority signal in order to detect whether the source has the highest or the second highest priority, and
- in that each source is provided with switching means controlled by the priority-bus detector in such a way that only those sources having the highest or second highest priority present the pixel data via the switching means to the pixel data bus and present the key signal to the key-data bus.

The use of a bus is in any case not limited to systems in which only two pixels are mixed in the mixing stage. It is possible to design mixing stages in such a way that more than two pixels can be mixed, taking into account the associated key signals. In this way, it is possible to achieve visual effects which cannot be attained, or can be attained only with difficulty, using mixing stages for two pixels.

In a more general sense, the invention provides a device for combining p video signals which represent images having a different perception depth, comprising
- p sources which each generate a video signal in the form of a series of pixels, each accompanied by a priority signal which determines the depth of the signal and a key signal which determines a local change in depth,
- selection means for selecting in each case m pixels from the p video signals available simultaneously (where m<p) which are currently accompanied by a priority signal corresponding to the m highest priorities,
- a mixing stage in which the selected m pixels are mixed, account being taken of the key signals, which device according to the invention is characterized
- in that all the p sources are coupled to the mixing stage via a bus system provided with a pixel data bus, a key-signal bus and a priority-signal bus,
- in that the priority-signal bus has a number of at least p conductors, each of the conductors corresponding to a certain priority,
- in that the priority signals comprise a single bit which is placed on the corresponding conductor of the priority-signal bus by each source,
- in that each source is provided with a priority-bus detector with which the signals on the priority bus are received and are compared with its own priority signal in order to detect whether the priority of the source falls within the m highest priorities, and
- in that each source is provided with switching means controlled by the priority-bus detector in such a way that only those sources having the m highest priorities present the pixel data via the switching means to the pixel data bus and present the key signal to the key-data bus.

As a result of connecting all the sources in parallel to a common bus and as a result of providing each source with a priority-bus detector, the entire selection process is in fact performed by the sources themselves. All the sources send their priority signal simultaneously to the priority bus. Each source then compares the total combination of priority signals on the priority bus with its own priority signal and each detector determines therefrom whether its own source has a priority which falls within the required group of highest priorities. Only the sources which meet the detection criterion will then present the total information, that is to say the pixel data with the associated priority data and key data, to the bus. This process takes place rapidly and the time needed is independent of the number of sources which participate in the process.

The number of sources can, in addition, readily be varied. Each source has to be provided only with a priority-bus detector and can then simply be connected to the bus. It is only on the width of the priority bus that requirements are imposed. It has to be sufficiently wide for each source to have a bus conductor available.

The invention will be explained below in more detail by reference to the accompanying figures.

Figure 1:
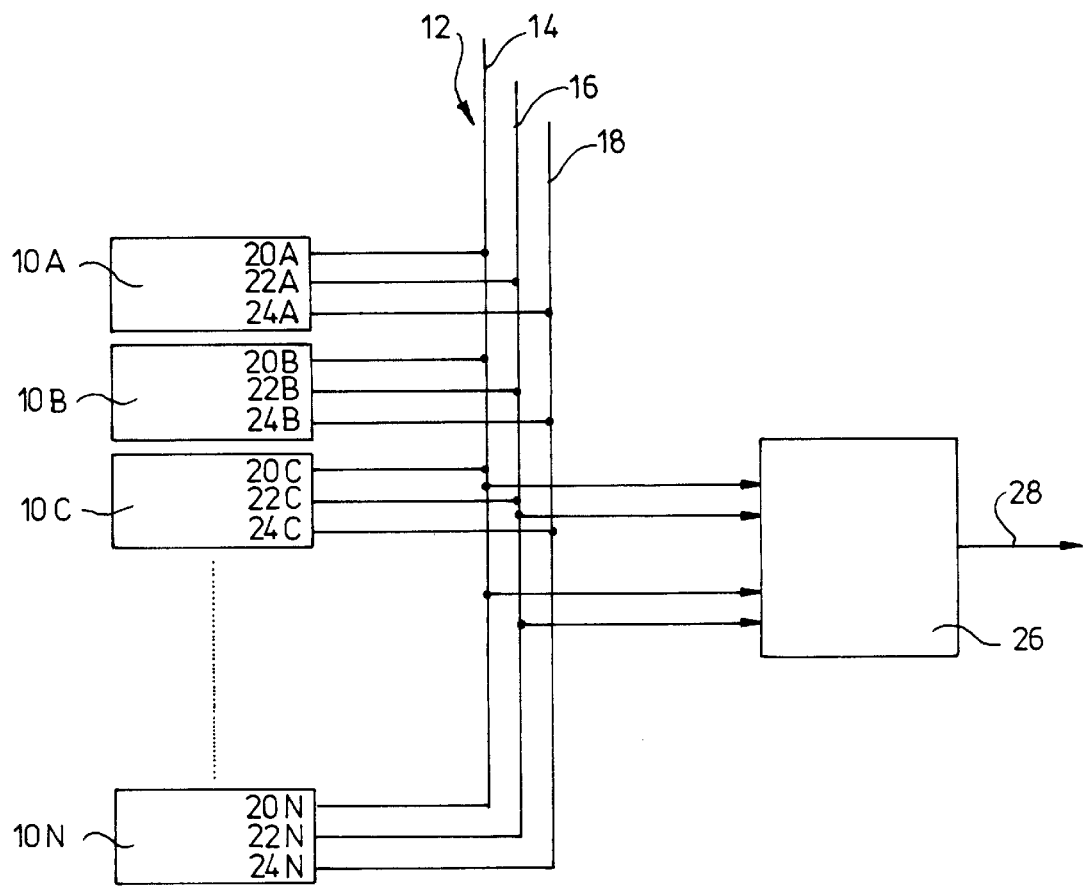
FIG. 1 shows a block diagram of a device according to the invention.

FIG. 1 shows in the form of a block diagram a device according to the invention with which the data of two pixels are fed to a mixing stage. The device is provided with a number of video sources 10 A, 10B, . . . , 10N and a mixing circuit 26. The video sources 10 are coupled to the mixing circuit 26 via a bus system 12.

In order to start, each of the video sources 10 can deliver a video signal comprising a series of pixel data via the output 20 to the pixel data bus 14 of the bus system 12. If it is assumed that the pixel data are presented to the bus in parallel, the width of the pixel data bus 14 depends on the number of bits which is emitted by the video source 10 per pixel.

Furthermore, each video source 10 can deliver a key signal via the output 22 to a key-signal bus 16. Said key signal is intended to enable switching in the mixing stage 26 between the one pixel and the other, depending on the current depth at which the pixels must be situated. The width of the key-signal bus 16 is dependent on the number of bits which is necessary to define the key signal.

Finally, each signal source 10 delivers a priority signal via the output 24 to a priority-signal bus 18. The number of conductors in said signal bus 18 is at least equal to the number of signal sources present.

Figure 3:
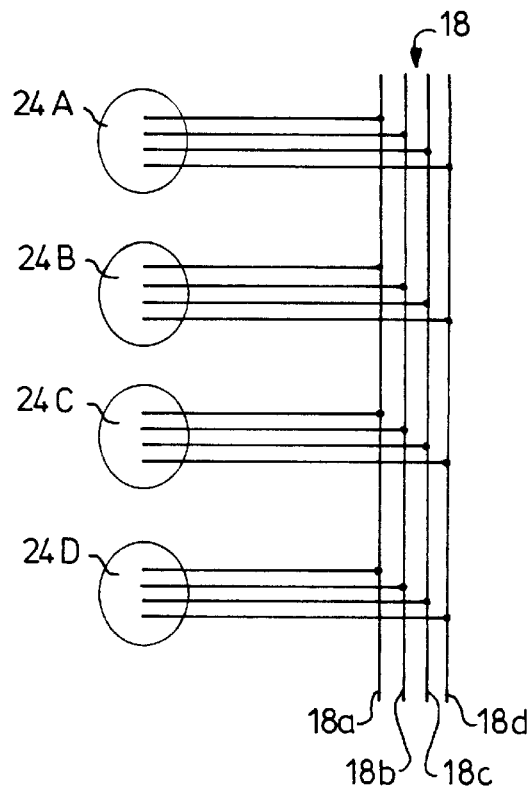
FIG. 3 shows an example of a possible priority-bus structure.

FIG. 3 shows an exemplary embodiment in which the bus 18 is provided with four bus conductors 18a, 18b, 18c, 18d, to which the priority-signal outputs 24A, 24B, 24C, 24D of four signal sources 10A, 10B, 10C and 10D (not shown in the figure) are connected. Its own priority level is assigned to each of the bus conductors 18a . . . 18d, it being assumed in the figure that the bus conductor 18a has the highest priority level and the bus conductor 18d the lowest.

Each priority signal comprises one single bit which, depending on the priority which said bit represents, is presented to one of the priority-signal bus conductors. Assuming that each signal source has a different priority for each pixel, every video signal source will therefore emit at any instant one priority bit to a different priority-signal bus conductor in each case.

Referring to FIG. 3, Table 1 below shows as an example a combination of priority signals on the various bus conductors 18a . . . 18e. In this connection, it is assumed that five sources and at least five bus conductors are present. Each priority signal comprises one single bit and all the priority signals are unequal so that one bit ultimately appears on each bus conductor.

TABLE 1

| Priority-bus conductor | high 18a | 18b | 18c | 18d | 18e | low . . . |
|---|---|---|---|---|---|---|
| source 10A | 0 | 1 | 0 | 0 | 0 | |
| 10B | 0 | 0 | 0 | 1 | 0 | |
| 10C | 1 | 0 | 0 | 0 | 0 | |
| 10D | 0 | 0 | 1 | 0 | 0 | |
| 10E | 0 | 0 | 0 | 0 | 1 | |

Figure 2:
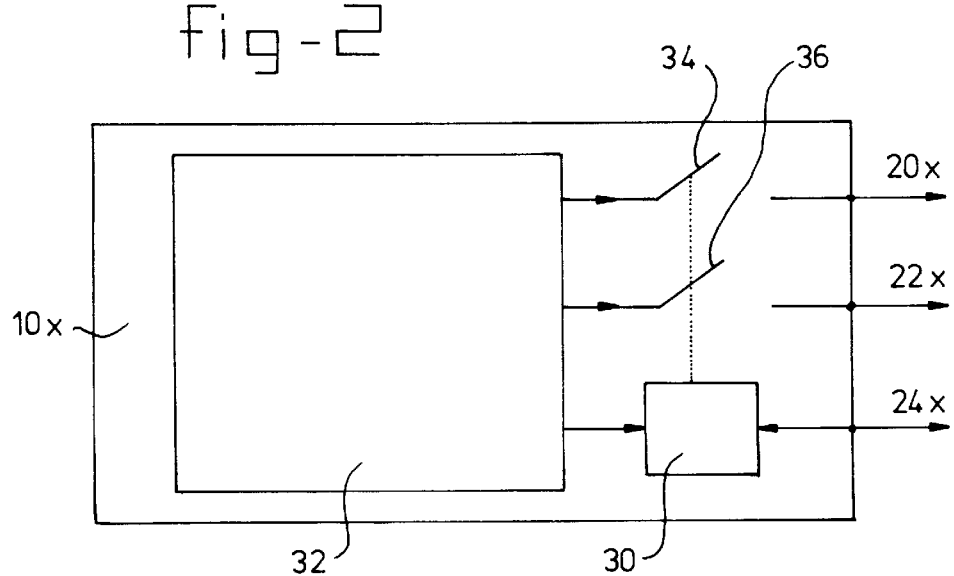
FIG. 2 shows in greater detail one of the signal sources from FIG. 1.

Each signal source 10A . . . 10N is provided with a priority-bus detector 30, as shown for any signal source 10x in FIG. 2. The priority signal of said signal source 10x is presented to the conductors of the priority-signal bus via the output 24x. Simultaneously, the priority-bus detector 30 looks at the signals which are present on the priority bus. Said detector compares the signals on the bus with its own priority signal and can establish in this process whether its own priority signal corresponds to the highest priority on the bus, corresponds to the second highest priority on the bus or corresponds to one of the other priorities.

In the example of Table 1, during the comparison process the detector of source 10C will determine that said source has the highest priority and the detector of source 10A will determine that said source has the second highest priority. All the other sources will determine a lower priority.

The source 10x is provided with the actual signal source, for example formed by a VRAM-FIFO 32, which delivers the pixel data, the priority signal and the key signal. The pixel data can be fed to the output 20x via a switch 34. The key signal can be fed to the output 22x via a switch 36. The two switches 34 and 36 are controlled by the priority-bus detector 30. If the priority-bus detector 30 determines that its own priority corresponds to the highest or to the second highest priority, the detector 30 will close the switches 34 and 36, as a result of which both the video data and the key signal are fed to the respective outputs 20x and 22x and are consequently fed to the bus. If the detector 30 determines that its own priority does not belong to the highest or second highest priority, the switches 34 and 36 remain open.

It will be clear that as a result of the combined operation of all the detectors 30a . . . 30n in all the video-signal sources 10A . . . 10N only the pixel data and key signals of those signal sources having the highest and second highest priority appear on the bus 12 in each case and are therefore fed to the mixing stage 26.

For the transmission of the various signals and data, use can be made of a time-division multiplexing method, in which, for example during a first period, the switches 34 and 36 of the source 10x having the highest priority are closed and, in a period subsequent thereto, the switches 34 and 36 of the source 10 having the second highest priority are closed. The pixel data and associated key signals are in that case successively fed to the mixing stage 26. In that case, the width of the pixel data bus can remain limited to the width which is necessary to transmit the data of one pixel. In addition, the mixing stage 26 can then be designed with only one pixel data input and only one key-signal input, in contrast to the embodiment shown in FIG. 1.

Figure 4:
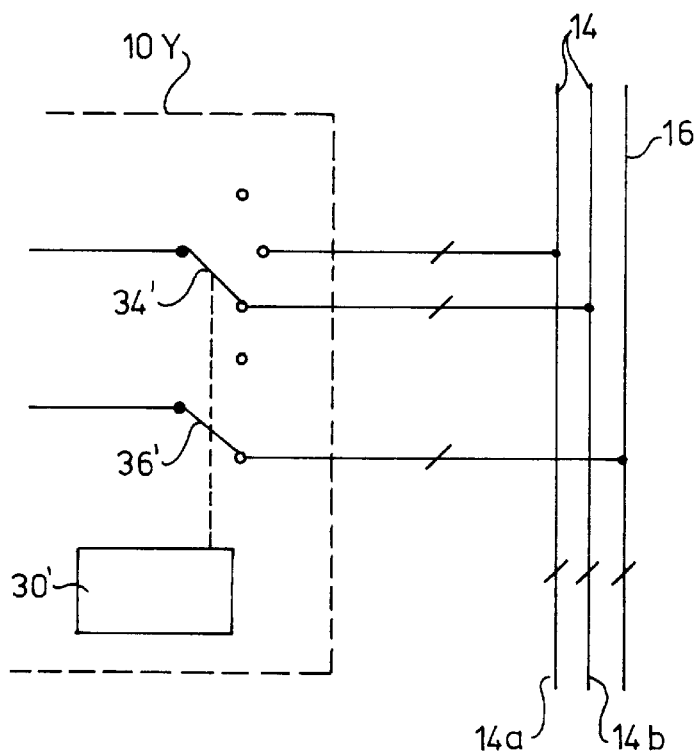
FIG. 4 shows the application of the space-division multiplexing principle within the pixel data bus.

In view of the time needed, it is preferable, however, to give the pixel data bus 14 a width which is twice as wide as needed for the pixel data of one single data source. In that case, the switch 34 can be designed and controlled in such a way that the pixel data of the source having the highest priority is always fed to a first part of the pixel data bus conductors, while the pixel data of the source having the second highest priority is always fed to a second part of the pixel data bus conductors. In that case, all the data needed are therefore fed simultaneously to the inputs of the mixing circuit 26. A possible embodiment is shown in FIG. 4.

In this figure, the pixel data bus 14 is divided into two subbuses 14a and 14b, each comprising a sufficient number of conductors to enable all the pixel data to be transmitted in parallel via the bus. The switch 34' is in this case designed as a three-position switch. In the highest position, no pixel data is supplied to the bus. In the central position, the switch 34' is connected to the part 14a of the pixel data bus, and in the lowest position the switch 34' is connected to the second part 14b of the pixel data bus. Depending on the priority determined by the detector circuit 30, the switch 34' is set to one of its positions.

Theoretically, the key-signal bus 16 should also have double the width in order to enable the key signal to be transmitted via one of the two parts depending on the priority. The key signal of the source having the highest priority and the key signal of the source having the second highest priority will, however, be the inverse of each other, so that it is not necessary to transmit both key signals to the mixing stage 26. In the example of FIG. 4, the switch 36' can therefore be designed as a two-position switch which may or may not present a key signal from the actual source (not shown in the figure) to the key-bus conductors 16.

Figure 5:
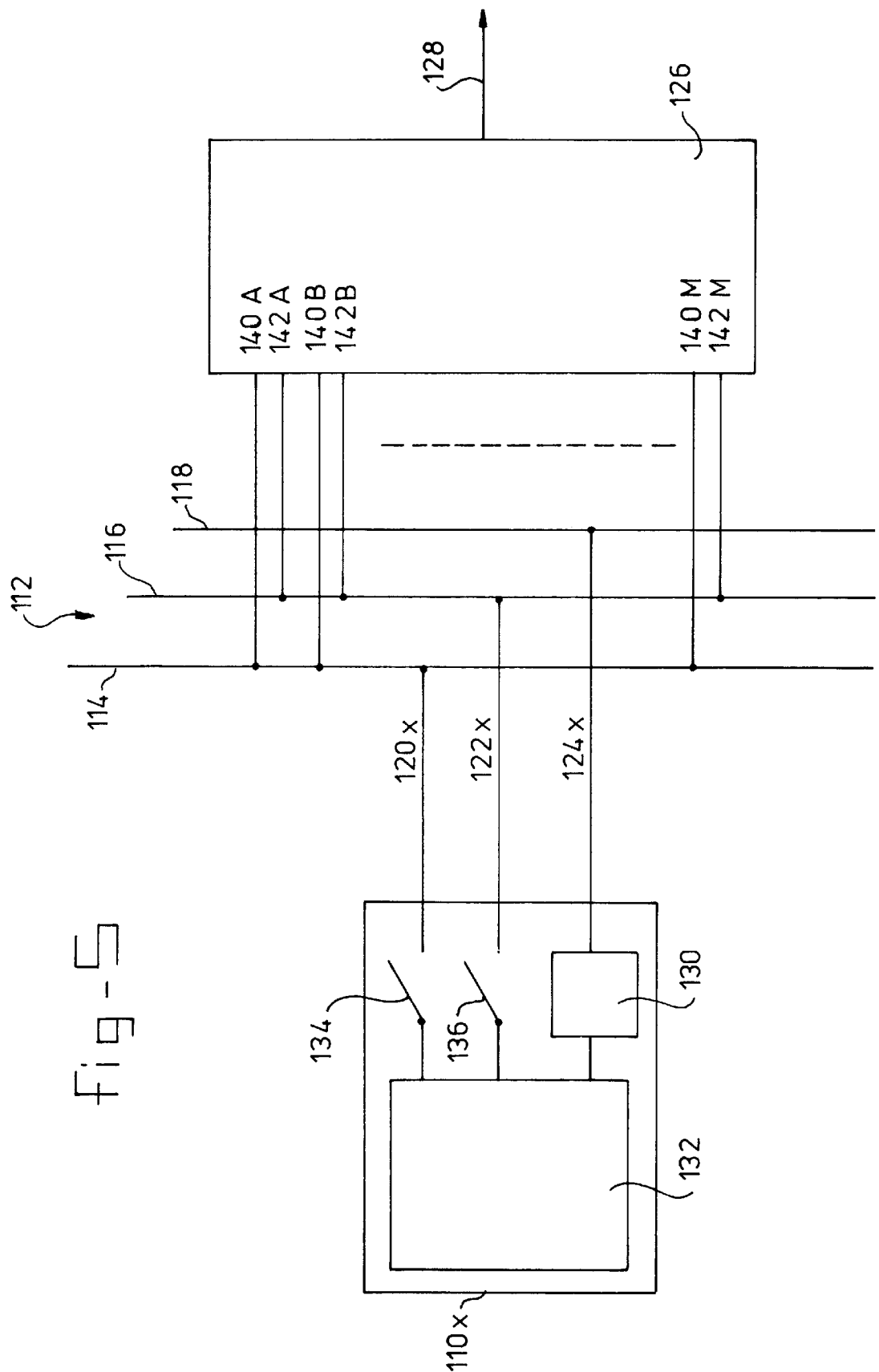
FIG. 5 shows an embodiment of the system intended for p signal sources which emit m pixel data to a mixing stage.

The above discussion of the exemplary embodiment proceeds from a system in which ultimately only the pixel data of two sources, the two sources having the highest and the second highest priority, are selected and processed in a mixing circuit. It is, however, also possible with only minor adjustments, to apply the principle of the invention in the case of a system in which p video-signal sources are present, of which m pixel data are mixed in a mixing stage (adapted to the purpose) to form the ultimately desired video signal. FIG. 5 very diagrammatically illustrates an example of such a configuration.

In FIG. 5, only one of the p video sources present having reference numeral 110x is indicated. Said video source comprises, in a manner similar to that illustrated in FIG. 2, the actual video generator 132, a priority-bus detector 130, a switch 134 for possibly feeding pixel data to an output 120x and another switch 136 for possibly transmitting key data to an output 122x.

The system is furthermore provided with a bus 112 subdivided into a pixel data bus 114, a key-data bus 116 and a priority bus 118.

The mixing stage 126 is provided in this exemplary embodiment with m pixel data inputs 140A, 140B, . . . 140M, which are each connected to the respective conductors of the pixel data bus 114. Furthermore, the circuit 126 is provided with m key-signal inputs 142A, 142B, . . . 142M which are connected in turn to the respective conductors of the key-data bus 116. FIG. 5 proceeds from the application of the space-division multiplexing principle. If time multiplexing is applied, the number of inputs 140 can be reduced to one single input and the number of inputs 142 can also be reduced to one single input.

During operation, all the video sources 110 will simultaneously place their priority data on the priority bus. The detector circuits 130 in each of the sources 110 are now designed in such a way that they recognize whether their own priority signal belongs to the m highest priorities. If this is the case, the switches 134 and 136 are controlled in an appropriate manner for presenting the pixel data and the associated key data to the bus 112 in such a way that they are fed to the mixing stage 126.

I claim:

1. Device for combining video signals which represent images having a different perception depth, comprising a number of sources which each generate a video signal in the form of a series of pixels, each accompanied by a priority signal which determines the depth of the signal and a key signal which determines a local change in depth, selection means for selecting in each case those pixels in the simultaneously available video signals which are currently accompanied by a priority signal corresponding to the highest and the second highest priority, a mixing stage in which the selected pixels are mixed, account being taken of the key signal, characterized in that all the sources are coupled to the mixing stage via a bus system provided with a pixel data bus, a key-signal bus and a priority-signal bus, in that the priority-signal bus has a number of conductors which is at least equal to the number of sources, each of the conductors corresponding to a certain priority, in that the priority signals comprise a single bit which is placed on the corresponding conductor of the priority-signal bus by each source, in that each source is provided with a priority-bus detector with which the signals on the priority bus are received and are compared with its own priority signal in order to detect whether the source has the highest or the second highest priority, and in that each source is provided with switching means controlled by the priority-bus detector in such a way that only those sources having the highest or second highest priority present the pixel data via the switching means to the pixel data bus and present the key signal to the key-data bus.

2. Device for combining p video signals which represent images having a different perception depth, comprising p sources which each generate a video signal in the form of a series of pixels, each accompanied by a priority signal which determines the depth of the signal and a key signal which determines a local change in depth, selection means for selecting in each case m pixels from the p video signals available simultaneously (where m<p) which are currently accompanied by a priority signal corresponding to the m highest priorities, a mixing stage in which the selected m pixels are mixed, account being taken of the key signals, characterized in that all the p sources are coupled to the mixing stage via a bus system provided with a pixel data bus, a key-signal bus and a priority-signal bus, in that the priority-signal bus has a number of at least p conductors, each of the conductors corresponding to a certain priority, in that the priority signals comprise a single bit which is placed on the corresponding conductor of the priority-signal bus by each source, in that each source is provided with a priority-bus detector with which the signals on the priority bus are received and are compared with its own priority signal in order to detect whether the priority of the source falls within the m highest priorities, and in that each source is provided with switching means controlled by the priority-bus detector in such a way that only those sources having the m highest priorities present the pixel data via the switching means to the pixel data bus and present the key signal to the key-data bus.

3. Device according to claim 1, characterized in that the number of conductors of the pixel data bus is equal to the number of bits of the pixel data and in that the switching means operate according to a time-division multiplexing mode in which the selected sources place their pixel data on the bus one after the other.

4. Device according to claim 1, characterized in that the number of conductors of the pixel data bus is equal to the product of the number of bits of the pixel data and the number of sources which can be selected and in that the switching means operate according to a space-division multiplexing mode in which the selected sources are each assigned a number of conductors of the pixel data bus for placing the pixel data on the bus.

5. Device according to claim 2, characterized in that the number of conductors of the pixel data bus is equal to the number of bits of the pixel data and in that the switching means operate according to a time-division multiplexing mode in which the selected sources place their pixel data on the bus one after the other.

6. Device according to claim 2, characterized in that the number of conductors of the pixel data bus is equal to the product of the number of bits of the pixel data and the number of sources which can be selected and in that the switching means operate according to a space-division multiplexing mode in which the selected sources are each assigned a number of conductors of the pixel data bus for placing the pixel data on the bus.

* * * * *